(12) United States Patent
Kozel

(10) Patent No.: US 11,073,212 B1
(45) Date of Patent: Jul. 27, 2021

(54) PACKING CARTRIDGE AND METHOD OF INSTALLATION

(71) Applicant: John A. Kozel, Basking Ridge, NJ (US)

(72) Inventor: John A. Kozel, Basking Ridge, NJ (US)

(*) Notice: Subject to any disclaimer, the term of this patent is extended or adjusted under 35 U.S.C. 154(b) by 0 days.

(21) Appl. No.: 17/110,861

(22) Filed: Dec. 3, 2020

(51) Int. Cl.
| F16J 15/18 | (2006.01) |
| F04D 29/10 | (2006.01) |
| F04D 29/12 | (2006.01) |
| F04D 29/60 | (2006.01) |
| F16C 33/74 | (2006.01) |

(52) U.S. Cl.
CPC ............ *F16J 15/188* (2013.01); *F04D 29/10* (2013.01); *F04D 29/12* (2013.01); *F04D 29/60* (2013.01); *F16C 33/74* (2013.01); *F16J 15/183* (2013.01)

(58) Field of Classification Search
CPC ......... F04D 29/10; F04D 29/12; F04D 29/60; F16J 15/18; F16J 15/182; F16J 15/183; F16J 15/188; F16C 33/046; F16C 33/1065; F16C 33/107; F16C 33/74; F16C 17/022; F16C 17/026
See application file for complete search history.

(56) References Cited

U.S. PATENT DOCUMENTS

| 990,841 | A * | 5/1911 | Collins | F16J 15/188 277/521 |
| 2,574,169 | A * | 11/1951 | Brown | B25B 27/0028 425/442 |
| 2,925,291 | A * | 2/1960 | Bygbjerg | B63H 23/36 277/511 |
| 4,047,858 | A * | 9/1977 | Zalis | F16J 15/183 418/201.1 |
| 4,270,762 | A * | 6/1981 | Johnston | F16J 15/40 277/308 |
| 4,301,893 | A * | 11/1981 | St. Jean | F16J 15/40 277/516 |
| 4,623,152 | A * | 11/1986 | St Jean | F16J 15/188 277/518 |
| 5,135,238 | A * | 8/1992 | Wells | F16J 15/183 277/514 |
| 5,840,399 | A | 11/1998 | Kozel | |
| 6,082,904 | A * | 7/2000 | Ono | F16C 9/00 384/291 |
| 6,834,862 | B2 * | 12/2004 | Wilkinson | F16J 15/183 277/510 |
| 8,939,646 | B2 * | 1/2015 | Forrest | F16C 43/02 384/143 |
| 9,206,903 | B2 * | 12/2015 | Huard | F16J 15/164 |
| 10,072,758 | B2 * | 9/2018 | Getto | F04D 29/049 |
| 10,273,970 | B2 | 4/2019 | Kozel | |
| 10,697,544 | B2 * | 6/2020 | Getto | F04D 29/049 |
| 10,731,645 | B1 | 8/2020 | Kozel | |
| 2003/0026718 | A1 * | 2/2003 | Dziver | F04D 29/047 417/423.9 |

(Continued)

*Primary Examiner* — Nicholas L Foster

(74) *Attorney, Agent, or Firm* — Richard M. Goldberg

(57) ABSTRACT

A split packing cartridge includes a sealing construct and a stabilizing bushing, and is installed in an apparatus directly upon a longitudinally extending shaft of the apparatus, along a site located intermediate opposite ends of the shaft, by assembling component parts of the packing cartridge upon the shaft, and placing of the assembly at the site, without the necessity for dismantling the apparatus.

7 Claims, 2 Drawing Sheets

(56) References Cited

U.S. PATENT DOCUMENTS

| | | | | |
|---|---|---|---|---|
| 2003/0107183 | A1* | 6/2003 | Wilkinson | F16J 15/183 |
| | | | | 277/510 |
| 2005/0040604 | A1* | 2/2005 | Dunford | F04D 29/106 |
| | | | | 277/602 |
| 2005/0213859 | A1* | 9/2005 | Kuroda | F16C 17/02 |
| | | | | 384/291 |
| 2007/0170657 | A1* | 7/2007 | Wilkinson | F16J 15/183 |
| | | | | 277/585 |
| 2007/0170658 | A1* | 7/2007 | Wilkinson | F16J 15/20 |
| | | | | 277/585 |
| 2017/0130729 | A1* | 5/2017 | Getto | F04D 29/10 |
| 2018/0363779 | A1* | 12/2018 | Getto | F16C 33/74 |
| 2020/0103034 | A1* | 4/2020 | Wilkinson | F16J 15/183 |
| 2020/0240408 | A1* | 7/2020 | Kozel | C01B 32/20 |

* cited by examiner

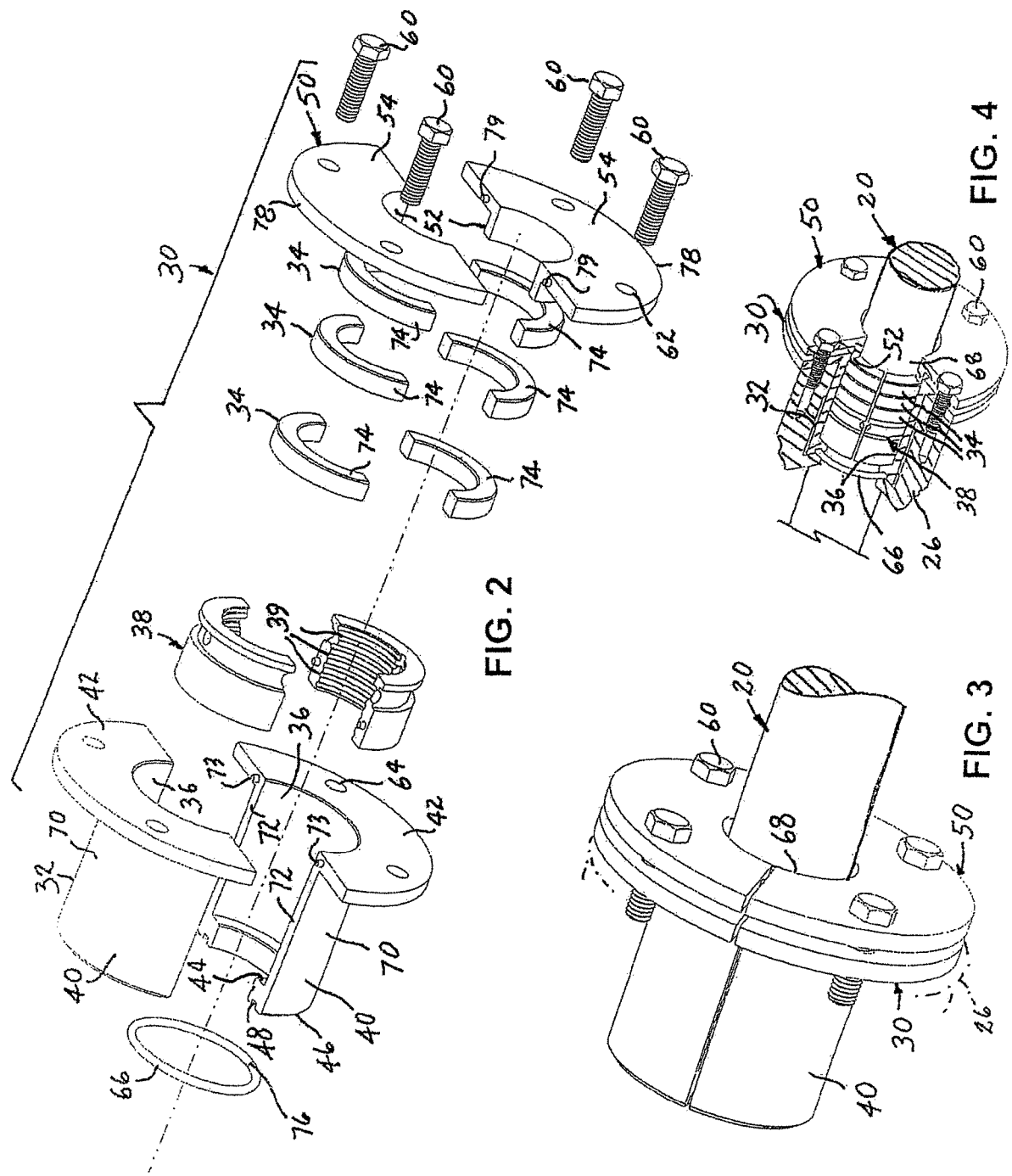

PACKING CARTRIDGE AND METHOD OF INSTALLATION

The present invention relates generally to establishing a seal along a rotating member of an apparatus, such as along a shaft rotating within a pump, and pertains, more specifically, to providing a packing cartridge that includes a stabilizing bushing and is placed within a pump housing, and has a construction that provides the ability to be installed without requiring dismantling of the pump, by virtue of the cartridge being divided along longitudinal boundaries to facilitate installation upon a longitudinal shaft arranged for rotation within the apparatus.

In the construction of rotating machinery, such as pumps and the like, it becomes necessary to seal a closed chamber, such as a pump chamber, while a rotating member, such as a driven shaft, projects from the chamber. A very large variety of seals has been developed for maintaining an effective seal where the shaft enters the chamber. In addition to providing effective sealing over an extended period of operation, such seals are best constructed for ready replacement once the useful life of the seal has expired. Replacement of such seals ordinarily requires relatively extensive disassembly and reassembly of the apparatus.

The present invention provides a sealing arrangement for rotational apparatus, with a packing cartridge incorporating a stabilizing bushing coupled with ease of replacement, when necessary, without requiring extensive dismantling of the apparatus. As such, the present invention attains several objects and advantages, some of which may be summarized as follows: Enables ready installation of a packing cartridge on a shaft mounted for rotation within an apparatus, without requiring dismantling of the apparatus through which the shaft extends; stabilizes the shaft as the shaft rotates during operation of the apparatus; serves to reduce pressure gradients along the shaft; reduces shaft vibration and unwanted movement during shaft rotation; provides adequate lubrication along the shaft; enables simple installation and ease of replacement, when necessary; exhibits exemplary performance over an extended service life.

The above objects and advantages, as well as further objects and advantages, are attained by the present invention which may be described briefly as a split packing cartridge having component parts constructed for installation in an apparatus, directly upon a longitudinally extending shaft of the apparatus, along a site located intermediate opposite ends of the shaft, by lateral movement into engagement with the shaft, the split packing cartridge comprising: an annular body comprised of at least two longitudinally extending circumferential members separated at and selectively assembled along complementary longitudinal boundaries to establish the annular body; a sealing construct comprised of a plurality of annular packing members, each packing member being split along at least one radial boundary for admitting the shaft within the sealing construct by relative lateral movement between the packing members and the shaft, and placement at the site, the packing members being configured for reception within the annular body; a stabilizing bushing split for admitting the shaft within the stabilizing bushing by relative lateral movement between the stabilizing bushing and the shaft, and placement at the site, the stabilizing bushing being configured for reception within the annular body, and including a plurality of circumferential grooves for juxtaposition along the shaft, at the site; and a securing construct for securing each circumferential member to the apparatus upon placement of the circumferential members, the packing members and the stabilizing bushing about the shaft, by relative lateral movement between the circumferential members and the shaft, and placement at the site, such that the circumferential members are joined together to establish the annular body, with the stabilizing bushing and the packing members received within the annular body and urged into an effective seal along the shaft, at the site, and the annular body secured to the apparatus, at the site.

Further, the present invention presents a method for installing a packing cartridge in an apparatus directly upon a longitudinally extending shaft of the apparatus, along a site located intermediate opposite ends of the shaft, by lateral movement into engagement with the shaft, the method comprising: providing an annular body comprised of at least two longitudinally extending circumferential members separated at and selectively assembled along complementary longitudinal boundaries to establish the annular body; providing a sealing construct comprised of a plurality of annular packing members, each packing member being split along at least one radial boundary for receiving the shaft within the sealing construct; providing a stabilizing bushing split for receiving the shaft within the stabilizing bushing; admitting the shaft within the stabilizing bushing and within the sealing construct by relative lateral movement between the stabilizing bushing and the shaft, and by relative lateral movement between the sealing construct and the shaft, and placement at the site, the stabilizing bushing and the packing members being configured for reception within the annular body; assembling the circumferential members to establish the annular body, with the stabilizing bushing and the packing members and the shaft received within the annular body; securing each circumferential member to the apparatus upon placement of the circumferential members, the stabilizing bushing and the packing members about the shaft, at the site; and urging the packing members into an effective seal along the shaft, at the site, with the annular body secured to the apparatus, at the site.

The invention will be understood more fully, while still further objects and advantages will become apparent, in the following detailed description of preferred embodiments of the invention illustrated in the following drawing, in which:

FIG. 2 is an exploded pictorial view of the split packing cartridge;

FIG. 3 is a somewhat diagrammatic pictorial view of the split packing cartridge assembled at a site on the shaft of the apparatus; and FIG. 4 is a somewhat diagrammatic pictorial view of the split packing cartridge, reduced in size and partially cut away to reveal internal details, and to illustrate installation on the shaft of the apparatus of FIG. 1.

Figure 1:
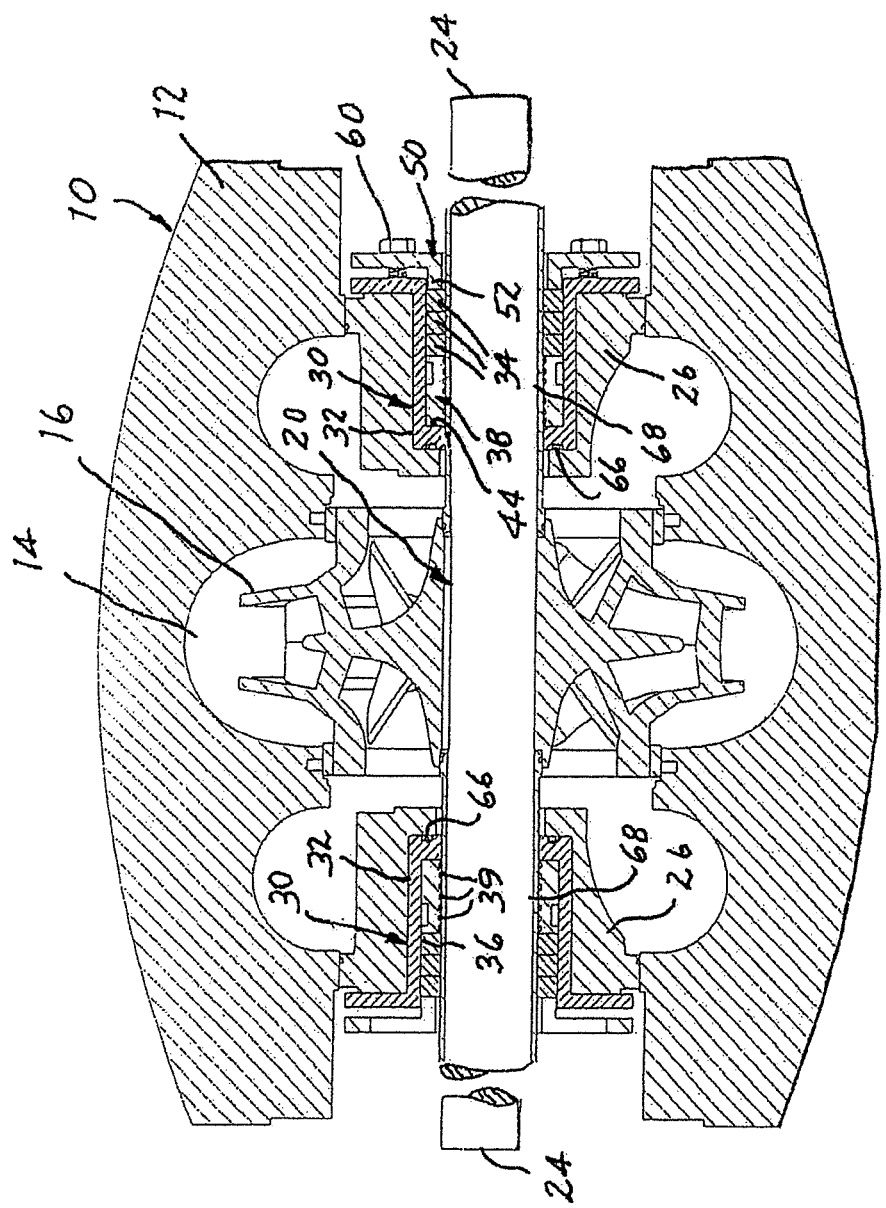
FIG. 1 is a longitudinal cross-sectional view of an apparatus in the form of a pump incorporating a split packing cartridge constructed in accordance with the present invention.

Referring now to the drawing, and especially to FIG. 1 thereof, an apparatus in the form of a pump 10 has a casing 12 enclosing a pump chamber 14 within which an impeller 16 is carried by a pump shaft 20 mounted for rotation within the casing 12 by bearing blocks (not shown) carried by the casing 12, adjacent opposite ends 24 of pump shaft 20, all in a now conventional manner. Stuffing boxes 26 seal pump chamber 14, utilizing packing cartridges 30 constructed in accordance with the present invention, each packing cartridge 30 being enclosed within a corresponding stuffing box 26, all as described herein below.

With reference now to FIGS. 2 through 4, as well as to FIG. 1, packing cartridge 30 includes an annular body in the form of a housing 32 within which there is placed a sealing construct comprised of a plurality of packing rings 34, preferably at least three such packing rings 34, all seated within an internal cylindrical surface 36 of housing 32. Packing cartridge 30 further includes, within internal cylindrical surface 36, a stabilizing bushing 38 constructed in accordance with the stabilizing bushing described fully in U.S. Pat. No. 10,731,645, the entire disclosure of which patent is incorporated herein by reference thereto. Thus, stabilizing bushing 38 includes a plurality of circumferential grooves 39 that serve to effect a reduction in pressure gradient along pump shaft 20. Housing 32 includes an axially extending cylindrical section 40 within which internal cylindrical surface 36 extends, and an integral radially outwardly extending flange 42 placed at one end 43 of cylindrical section 40. A radially inwardly extending shoulder 44 is located at opposite end 46 of cylindrical section 40, and an annular groove 48 is placed at opposite end 46.

A securing construct in the form of a packing gland 50 includes an axially extending cylindrical projection in the form of a sleeve 52 and a radially extending brim 54. A plurality of threaded fasteners in the form of bolts 60 are extended through counterpart holes 62 in brim 54 to pass through corresponding holes 64 in flange 42 of housing 32 and into counterpart stuffing box 26 such that upon securement of bolts 60 within stuffing box 26, sleeve 52 will engage an adjacent packing ring 34 to urge packing rings 34 in an axial direction AD toward shoulder 44, with an axial force AF effective to establish and maintain a desired seal along pump shaft 20 while securing housing 32 within stuffing box 26. At the same time, placement of stabilizing bushing 38 between packing rings 34 and shoulder 44 establishes an advantageous reduction of pressure gradient between stuffing box 26 and packing rings 34, thereby facilitating an effective seal at packing rings 34. In addition, a sealing ring in the form of an O-ring 66, previously seated within annular groove 48 of housing 32, completes a seal between housing 32 and stuffing box 26.

In further reference to FIG. 2, in order to facilitate installation of packing cartridge 30 directly upon pump shaft 20, and placement at the site shown at 68, located between opposite ends 24 of the pump shaft 20, without requiring dismantling of the pump 10, component parts of the packing cartridge 30 are divided along longitudinal boundaries to effectively split packing cartridge 30 so as to enable assembly of component parts of the packing cartridge 30 along pump shaft 20, and placement at site 68, between opposite ends of the pump shaft 20. Thus, housing 32 is split, preferably into at least two separate longitudinally extending circumferential members 70 selectively placed over pump shaft 20, to be assembled along complementary longitudinal boundaries 72, assisted by pins 73, to establish the housing 32 and enable placement of the housing 32 at site 68. Each packing ring 34 is split, preferably into at least two separate segments 74 to enable placement of assembled packing rings 34 within housing 32 to be located at site 68. Likewise, stabilizing bushing 38 is split and is assembled upon pump shaft 20, to be located at site 68, as described more fully in the aforesaid U.S. Pat. No. 10,731,645. Further, O-ring 66 is split at 76 to enable placement within annular groove 48 established upon assembly of members 70, for location at site 68.

In a similar manner, packing gland 50 preferably is divided into at least two separate component parts 78. Upon assembly of housing 32 along pump shaft 20, together with packing rings 34 and stabilizing bushing 38, placed within housing 32, as well as with O-ring 66 seated in annular groove 48, the component parts 78 of packing gland 50 are assembled, assisted by pins 79, and set into engagement in desired alignment, and packing gland 50 is secured in place at site 68 with bolts 60 threaded into stuffing box 26, thereby maintaining the packing rings 34 in appropriate configuration and alignment along pump shaft 20 for establishing an effective seal along pump shaft 20, at site 68, and securing the component parts of packing cartridge 30 together in place at site 68, with sleeve 52 urged axially against packing rings 34 to assure a long-term effective seal along pump shaft 20, at site 68. At the same time, stabilizing bushing 38 effects an advantageous reduction in pressure gradient along pump shaft 20 and serves to provide all of the objects and advantages set forth in the aforesaid U.S. Pat. No. 10,731,645.

In the preferred construction, housing 32 and packing gland 50 are constructed of a fiber reinforced structural composite material, as described fully in U.S. Pat. Nos. 5,840,399 and 10,273,970, the entire disclosures of which patents are incorporated herein by reference thereto.

It will be apparent that the present invention attains all of the objects and advantages summarized above, namely: Enables ready installation of a packing cartridge on a shaft mounted for rotation within an apparatus, without requiring dismantling of the apparatus through which the shaft extends; stabilizes the shaft as the shaft rotates during operation of the apparatus; serves to reduce pressure gradients along the shaft; reduces shaft vibration and unwanted movement during shaft rotation; provides adequate lubrication along the shaft; enables simple installation and ease of replacement, when necessary; exhibits exemplary performance over an extended service life.

It is to be understood that the above detailed description of preferred embodiments of the invention is provided by way of example only. Various details of design, construction and procedure may be modified without departing from the true spirit and scope of the invention, as set forth in the appended claims.

The embodiments of the invention in which an exclusive property or privilege is claimed are defined as follows:

1. A split packing cartridge having component parts constructed for installation directly upon a longitudinally extending rotating shaft of a pump as a unitary packing cartridge containing all component parts, along a site located intermediate opposite ends of the shaft, by lateral movement into engagement with the shaft, the split packing cartridge comprising:

a diametrically split annular body comprised of at least two longitudinally extending circumferential members separated at and selectively assembled along complementary longitudinal boundaries to establish the annular body;

a diametrically split sealing construct comprised of a plurality of diametrically split annular packing members, each packing member being split along at least one radial boundary for admitting the shaft within the sealing construct by relative lateral movement between the packing members and the shaft, and placement at the site, the packing members being received within the annular body;

a diametrically split stabilizing bushing split for admitting the shaft within the stabilizing bushing by relative lateral movement between the stabilizing bushing and the shaft, and placement at the site, the stabilizing bushing being received within the annular body, and including a plurality of circumferential grooves for juxtaposition along the shaft, at the site, the stabilizing bushing having dimensions to provide a close tolerance with the shaft when mounted thereon to stabilize the shaft by limiting radial movement of the shaft; and a diametrically split securing construct for securing each circumferential member to the apparatus upon placement of the circumferential members, the packing members and the stabilizing bushing about the shaft, by relative lateral movement between the circumferential members and the shaft, and placement at the site, such that the circumferential members are joined together to establish the annular body, with the stabilizing bushing and the packing members received within the annular body and urged into an effective seal along the shaft, at the site, and the annular body secured to the apparatus, at the site, and the annular body, sealing construct, stabilizing bushing and the sealing construct together forming the unitary packing cartridge for disassembly and assembly relative to the shaft as a unitary unit.

2. The split packing cartridge of claim 1, wherein the sealing construct comprises at least three annular packing members.

3. The split packing cartridge of claim 1, wherein:

the annular body includes a first end and a longitudinally opposite second end, and each circumferential member includes a flange extending radially outwardly at the first end, and a shoulder extending radially inwardly at the second end, such that with the shaft placed within the sealing construct and placed within the stabilizing bushing, at the site, the stabilizing bushing is located longitudinally between the sealing construct and the shoulders; and the securing construct comprises:

a packing gland divided into two gland segments, each gland segment having a radial brim and a projection extending axially from the radial brim such that upon placement of the gland segments over the shaft, at the site, in juxtaposition with the first end of the annular body, each brim will overlap a corresponding one of the flanges, and each projection will engage the packing members; and fasteners arranged to secure each brim to the apparatus, while urging each projection against the packing members, toward the shoulder, to establish the effective seal along the shaft, and secure the annular body to the apparatus, at the site.

4. The split packing cartridge of claim 3, including a sealing ring seated at the second end of the annular body for effecting a seal between the second end of the annular body and the apparatus upon securing the annular body to the apparatus.

5. The split packing cartridge of claim 3, wherein the annular body is constructed of a fiber reinforced structural composite material.

6. The split packing cartridge of claim 5, wherein the packing gland is constructed of a fiber reinforced structural composite material.

7. The split packing cartridge of claim 1, wherein the annular body is constructed of a fiber reinforced structural composite material.

* * * * *